United States Patent [19]
Titus et al.

[11] Patent Number: 5,787,841
[45] Date of Patent: Aug. 4, 1998

[54] APPARATUS AND METHOD FOR ELECTRONIC EXCLUSION AND CONFINEMENT OF ANIMALS RELATIVE TO A SELECTED AREA

[75] Inventors: John Titus; Jim Barry, both of Prior Lake; Max Hendrickson, Forest Lake; James F. Jenné, Inver Grove Heights, all of Minn.

[73] Assignee: Joint Techno Concepts International, Inc., Westboro, Mass.

[21] Appl. No.: 796,986

[22] Filed: Feb. 7, 1997

Related U.S. Application Data

[63] Continuation-in-part of Ser. No. 741,852, Oct. 29, 1996.
[51] Int. Cl.⁶ ................................................ A01K 15/02
[52] U.S. Cl. ................................................ 119/721
[58] Field of Search ........................ 119/718, 719, 119/720, 721, 771

[56] References Cited

U.S. PATENT DOCUMENTS

| | | |
|---|---|---|
| D. 330,173 | 10/1992 | Juliana et al. . |
| D. 330,685 | 11/1992 | Juliana et al. . |
| D. 336,055 | 6/1993 | Juliana et al. . |
| 3,753,421 | 8/1973 | Peck . |
| 4,150,464 | 4/1979 | Tracy . |
| 4,171,555 | 10/1979 | Bakker et al. . |
| 4,180,013 | 12/1979 | Smith .................................. 119/718 |
| 4,669,424 | 6/1987 | Bianco et al. . |
| 4,898,120 | 2/1990 | Brose . |
| 4,967,695 | 11/1990 | Giunta . |
| 4,996,945 | 3/1991 | Dix, Jr. . |
| 5,053,768 | 10/1991 | Dix, Jr. . |
| 5,067,441 | 11/1991 | Weinstein . |
| 5,161,485 | 11/1992 | McDade . |
| 5,207,178 | 5/1993 | McDade et al. . |
| 5,241,923 | 9/1993 | Janning ............................... 119/721 |
| 5,349,926 | 9/1994 | McCarney et al. . |
| 5,381,129 | 1/1995 | Boardman ........................... 119/721 |
| 5,425,330 | 6/1995 | Touchton et al. . |
| 5,435,271 | 7/1995 | Touchton et al. ................... 119/721 |
| 5,445,900 | 8/1995 | Miller, Jr. et al. . |
| 5,476,729 | 12/1995 | Miller, Jr. et al. . |
| 5,575,242 | 11/1996 | Davis et al. ........................ 119/721 |
| 5,636,597 | 6/1997 | Van Curen et al. ................ 119/721 |

*Primary Examiner*—Thomas Price
*Attorney, Agent, or Firm*—Merchant, Gould, Smith, Edell, Welter & Schmidt, P.A.

[57] ABSTRACT

The present invention discloses a method and apparatus for electronically controlling the movement of one or more animals relative to a selected area. The selected area may be an exclusion area into which an animal is deterred from entering, or may be a confinement area from which the animal is deterred from leaving. The animal is provided with a collar unit, which includes a sensor adapted to sense the strength of electromagnetic signals generated by a generator located in the selected area, and a correction unit adapted to provide correction to the animal in response to a sensor output. The portable unit may report to a central controller which selects a correction strategy, such as level of correction to be applied to the animal approaching the perimeter of the selected area. The controller provides warnings to the user, including warnings for when the battery in the collar unit goes low and when the animal stays in a correction zone for too long. The controller may control a number of generators, and may select an appropriate correction for one of a plurality of animals.

40 Claims, 14 Drawing Sheets

APPARATUS AND METHOD FOR ELECTRONIC EXCLUSION AND CONFINEMENT OF ANIMALS RELATIVE TO A SELECTED AREA

This is a continuation-in-part of application Ser. No. 08/741,852, filed 29th Oct., 1996, pending.

BACKGROUND OF THE INVENTION

1. Field of the Invention

This invention relates in general to a method and apparatus for controlling movement of an animal and, in particular, to a method and apparatus for electronically preventing an animal from approaching an area to be protected from intrusion by the animal.

2. Description of Related Art

Electronic animal control systems commonly either contain an animal within a perimeter delineated by a wire, or are of the form of an "electronic tether." When using a typical perimeter device, the animal is deterred from crossing the perimeter by applying an electronic correction signal to the animal after it approaches within a preselected distance of the wire. Detecting the proximity of the wire is typically performed by use of a sensor on a collar unit provided on the animal, where the sensor senses an electromagnetic field around the wire. The electronic correction is supplied by the collar unit and is typically either an acoustic signal or an electric shock.

"Electronic tether" systems use a similar collar unit but, in this case, the electronic correction is applied to the animal when the distance between a collar unit and a central transmitter, as measured by the strength of a received electromagnetic signal, exceeds a predetermined range. The animal receives correction when it has strayed too far from the central transmitter.

These electronic animal control systems are relatively unsophisticated devices, and are not well suited to use indoors. For example, it would appear that an outdoor perimeter device could be used indoors to deter an animal from approaching a door, thus keeping the animal in the room. However, such a perimeter unit requires that a perimeter wire be laid around the entire room, which significantly reduces the area within the room in which the animal may roam without receiving correction. Additionally, present electronic control systems are unable to distinguish which of several animals requires attention, assuming that more than one animal is provided with a collar unit, and the control systems, therefore, treat all animals in the same manner. Typically, no record is kept of animal activity, for example how many corrections the animal received in any particular time period.

A conventional collar unit is generally an autonomous unit which is battery powered. The lifetime of the battery is affected by many factors, including the number of corrections which are provided to the animal. The user is not provided with information regarding the number of corrections the animal receives, nor with the current state of the battery. Thus, the user may be unaware that the battery has lost charge, and the user has to guess when a new battery is needed in the collar unit. Additionally, a conventional collar unit is provided with metal contact pins of fixed length. These pins, typically of fixed length, may have to be changed according to the thickness of the coat of the animal. For example, a dog with a thin coat, such as Doberman Pinscher, requires shorter pins, while a dog with a long coat, such as an English Sheepdog, requires longer pins. Current collar units provide the user with a number of sets of pins, which the user has to connect manually to the collar unit. The pins would require changing if, for example, a collar unit normally used on a dog with a thin coat, were to be used on a dog with a thicker coat.

Indoor pet control systems are available which repel a pet from a prescribed area. Such systems typically use ultrasonic transmitters to generate a continuous repulsion signal. The animal is dissuaded from entering the area simply because the volume of the ultrasonic signal is uncomfortably high. Systems of this type suffer from several deficiencies, including a lack of intelligence, so the system cannot distinguish between different animals which may approach the protected area. Since the ultrasonic signal is generally continuous, the animal is subjected to constant annoyance, even when outside the area being protected.

Therefore, there is a need for an electronic animal control system which does not confine an animal to only a portion of a room when the desired restriction is simply to prevent it from leaving the room. There is also a need for a more sophisticated system which is able to warn the user when an animal receives correction or when the battery in the collar unit is low. There is a general need for a more sophisticated approach to electronically controlling an animal which can provide the user with many advanced features not available with current systems, including the management of a number of containment spaces, and where each containment space may be pre-programmed to be applicable to each particular animal present. There is also a need for a collar unit having improved metal contact pins which do not require repeated adjustment or reinstallation by the user.

SUMMARY OF THE INVENTION

To overcome the limitations in the prior art, such as those described above, and to overcome other limitations that will become apparent upon reading and understanding the present specification, the present invention is directed to a method and apparatus for electronically deterring an animal from entering a selected exclusion area.

A first embodiment of an apparatus employed to deter an animal from entering an exclusion area includes a portable unit provided on the animal which has a sensor that senses the animal's approach to the exclusion area.

A second embodiment of an apparatus includes a portable unit provided on the animal which is in radio contact with a central control unit. When the portable unit detects the animal's approach to the exclusion area, the portable unit transmits a request for instruction to the central control unit. The central control unit is programmed to provide an appropriate command to the portable unit, preferably by use of an encoded electromagnetic signal transmitted to the portable unit.

A third embodiment of an apparatus according to the principles of the present invention includes a portable unit provided on the animal which includes a sensor that senses whether the animal approaches an exclusion area formed between two synchronized exclusion units. When the apparatus senses the animal approaching the exclusion area, the portable unit provides the appropriate acoustic or electrical correction to the animal.

In accordance with a fourth embodiment of the invention, a transmitter transmits electromagnetic signals and the portable unit, under control of a control unit, provides correction to the animal in accordance with the strength of the electromagnetic signal detected. For example, the transmitter may be placed within an area from which the animal is to be excluded, or may be in an area in which the animal is to be confined.

In accordance with a fifth embodiment of the invention, a portable unit is provided where the metal contact pins for applying an electrical shock to the animal are spring-loaded so as to automatically adjust in length in response to the thickness of the animal's fur or hair.

In accordance with a sixth embodiment of the invention, a portable unit is provided with a segmented band for attaching the portable unit to the animal.

The use of a central control unit in one embodiment advantageously allows data storage and decision making functions to be provided in a central location, thus allowing these functions to be easily programmable, and permitting the portable units to be simpler and smaller than those currently available. The central control unit's selection of correction to be applied to the animal depends on a number of factors, including the distance between the animal and an exclusion unit located within the exclusion area. The central control unit permits the user to program a variety of control parameters, including the level of acoustic signal and electric shock, as a function of distance from the exclusion unit. The central control unit advantageously permits the control of a number of portable units simultaneously, thus allowing the control of several animals relative to the exclusion area. The correction instructions transmitted to each portable unit may be different, permitting unique correction strategies to be programmed for each animal. The use of a central control unit advantageously permits the individual control of a number of exclusion units, thus permitting simultaneous control of a number of separate exclusion areas.

A system operating in accordance with the principles of the present invention may provide warnings to the user when, for example, a particular animal approaches the exclusion area, the battery goes low, or if the animal does not move away from the exclusion area. Another advantageous feature includes the ability to connect a computer to the system for providing remote set-up, monitoring, and control, and for maintaining a log of animal behavior.

BRIEF DESCRIPTION OF THE DRAWINGS

Referring now to the drawings in which like reference numbers represent corresponding parts throughout.

DETAILED DESCRIPTION OF THE ILLUSTRATED EMBODIMENTS

In the following description of the illustrated embodiment, reference is made to the accompanying drawings which form a part hereof, and in which is shown by way of illustration, various embodiments in which the invention may be practiced. It is to be understood that other embodiments may be utilized and structural changes may be made without departing from the scope of the present invention.

The present invention is directed to an apparatus for electronically controlling the movement of an animal with respect to a prescribed area. Typically, the animal may be a pet, and the prescribed area, such as an exclusion area, may be a portion of a front or back yard, or may be an area within a house, such as an area around a doorway or close to selected items of furniture which the owner wishes to protect. Unlike prior methods of electronically controlling the movement of animals, the present invention allows the animal to roam freely outside the exclusion area, and provides a warning to the animal when the animal approaches the exclusion area. The warning typically includes a correction, preferably in the form of an audible signal or an electric shock, in order to dissuade the animal from making any further approach to the exclusion area. The invention is particularly effective in preventing an animal from approaching a doorway or archway in a house, which represents an important capability when electronically restricting the movement of a pet within a house. The illustrated embodiments are discussed in terms of protecting doorways and archways within a house, but the invention is not restricted to such use, as is discussed hereinbelow.

Figure 1:
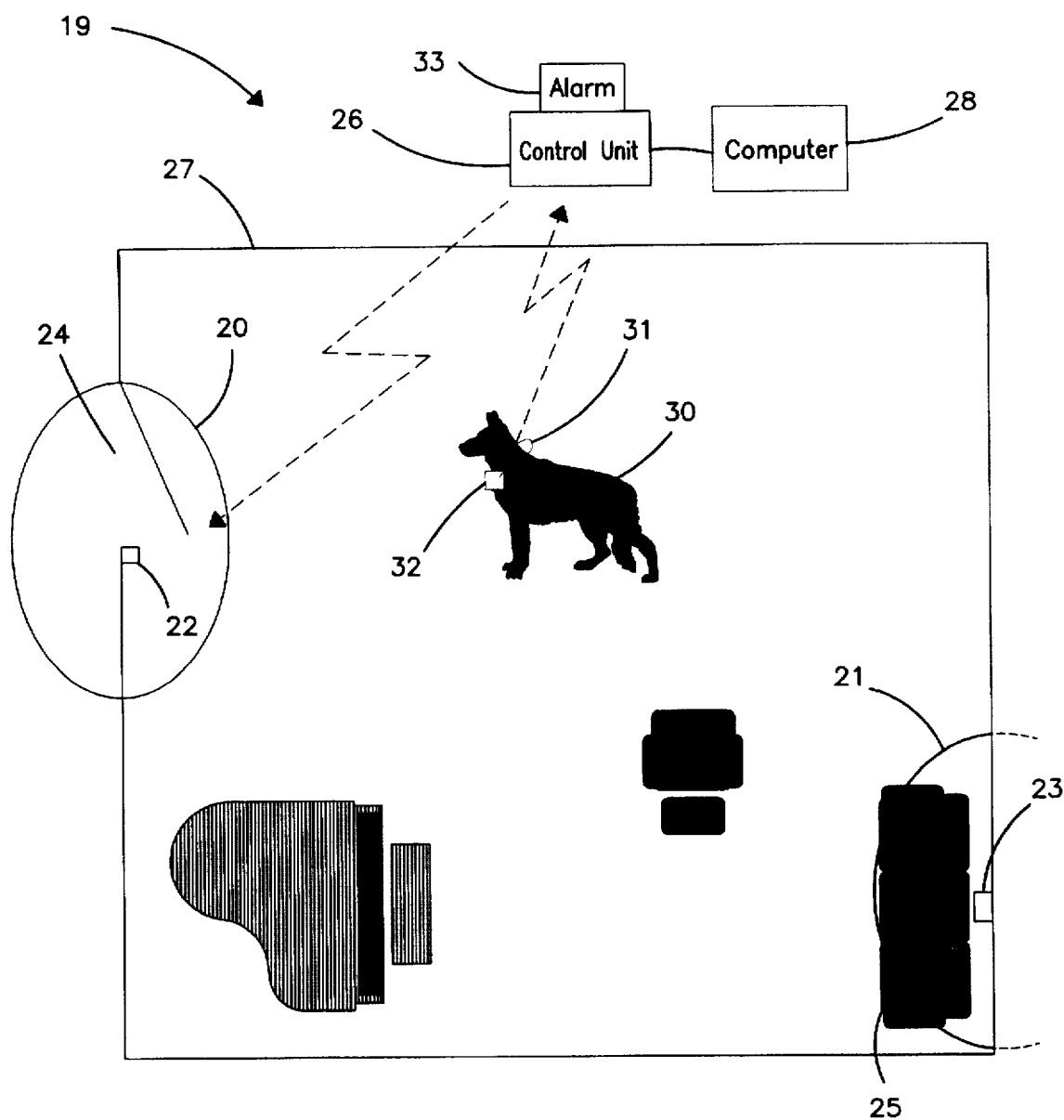
FIG. 1 illustrates an apparatus for providing electronic exclusion of animals according to the principles of the present invention.

Referring now to FIG. 1, which shows an animal control apparatus 19, an exclusion area 20 associated with exclusion unit 22 is located close to a doorway 24 of a room 27. The exclusion area 20 is an area around the exclusion unit 22 which deters the animal from approaching the exclusion unit 22. By positioning the exclusion unit 22 close to the doorway 24, the doorway 24 is included within the exclusion area 20. Thus, the animal 30 is deterred from approaching the doorway 24 and is contained within the room 27.

The exclusion unit 22 is controlled by a control unit 26 which is connected to a computer 28. The control unit 26 may be a stand alone unit, connectable to an external computer, or may be an integral part of the computer, for example a board plugged into one of the extension slots of the computer 28. The following description refers to the first exclusion area 20 and exclusion unit 22, but may be applied equally to a second exclusion area 21 and second exclusion unit 23 positioned so as to deter the animal 30 from approaching, for example, an item of furniture 25. The animal 30 is provided with a portable unit 32. The portable unit 32 is attached to the animal 30 by use of a collar 31 placed around the animal's neck, but may also be attached by use of a belt around the animal's abdomen or leg, or attached to the animal in a similar way.

The exclusion unit 22 typically produces a modulated magnetic field. The portable unit 32 includes a magnetic sensor to detect the modulated magnetic field produced by the exclusion unit 22, and is generally sufficiently sensitive to provide a positive detection of the electromagnetic field at a distance ranging from approximately two to six feet from the exclusion unit 22. It is understood that the detection range from the exclusion unit may be larger than six feet. The portable unit 32 includes a radio transmitter which transmits a signal to the control unit 26 indicating that an attempt has been made by the animal 30 to enter a particular exclusion area. If the portable unit 32 or control unit 26 determines that the animal 30 has entered the exclusion area 20, then the control unit 26 may activate an alarm 33 which alerts the owner or guardian of the animal 30 to the animal's intrusion into the exclusion area 20.

The portable unit 32 is provided with a sensor which senses the strength of the electromagnetic field produced by the exclusion unit 22. The strength of the electromagnetic field is determined by the distance from the exclusion unit 22 to the portable unit 32.

Figure 2:
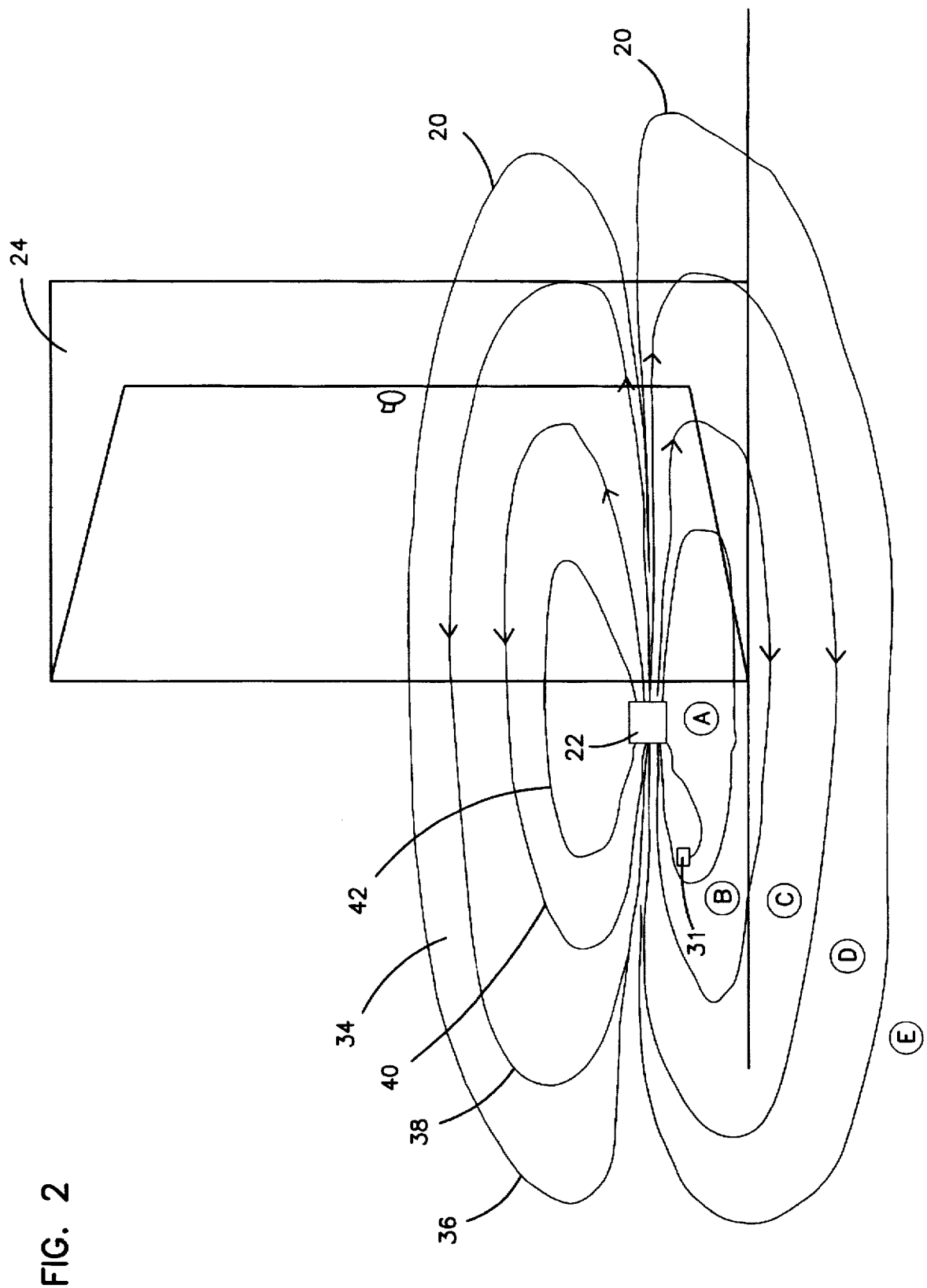
FIG. 2 illustrates a magnetic field around an electronic exclusion apparatus.

FIG. 2 illustrates the formation of the exclusion area 20 by the exclusion unit 22 close to a doorway 24. The exclusion unit 22 is preferably mounted close to the door jamb of the doorway 24, and is powered by household electric power from the wall socket 31. In one embodiment, the exclusion unit 22 is at an originating point within the exclusion area 20, and does not peripherally generate an electromagnetic field surrounding an essentially field-free region where the animal 30 may be located. For example, in contrast to a conventional wire loop approach, the exclusion unit 22 provides localized generation of the exclusion area 20, permitting selective designation of exclusion areas where desired within a given environment. The resulting electromagnetic field 34 has a dipole-type profile, and contours of increasing electromagnetic field strength 36, 38, 40 and 42 lie increasingly closer to the exclusion unit 22. It is understood that the shape of the exclusion area 20 is dependent on the source used for generating the electromagnetic field 34 included in the exclusion unit 22. It may be useful, for example in protecting a table, to employ an electromagnetic field 34 which is more circular than the electromagnetic field 34 illustrated. A differently shaped field may be generated, for example, using an antenna having a different configuration, or by including additional elements to shape the field.

Different zones A, B, C, D, and E, marked by respective letters within circles, represent areas of decreasing electromagnetic field strength. Zone E is outside the exclusion area 20. When the animal 30 enters the exclusion area 20, for example by passing from zone E to zone D, the portable unit 32 detects an increase in electromagnetic field strength and transmits a signal, indicative of the electromagnetic field strength relative to the animal's position within the exclusion area 20, to the control unit 26. The control unit 26 responds by selecting an appropriate, selectable level of correction for the animal, typically an audible signal or an electric shock, depending on which zone (A–D) the animal 30 has entered or on the length of time for which it has failed to respond to the applied correction. If the control unit 26 is programmed to exclude the animal 30 from the exclusion area 20, the control unit 26 transmits a correction control signal to the exclusion unit 22. The correction control signal is encoded on the electromagnetic field 34 generated by the exclusion unit 22. The portable unit 32 detects the encoded electromagnetic field 34 and provides correction to the animal 30 in accordance with the received correction signal.

Figure 3:
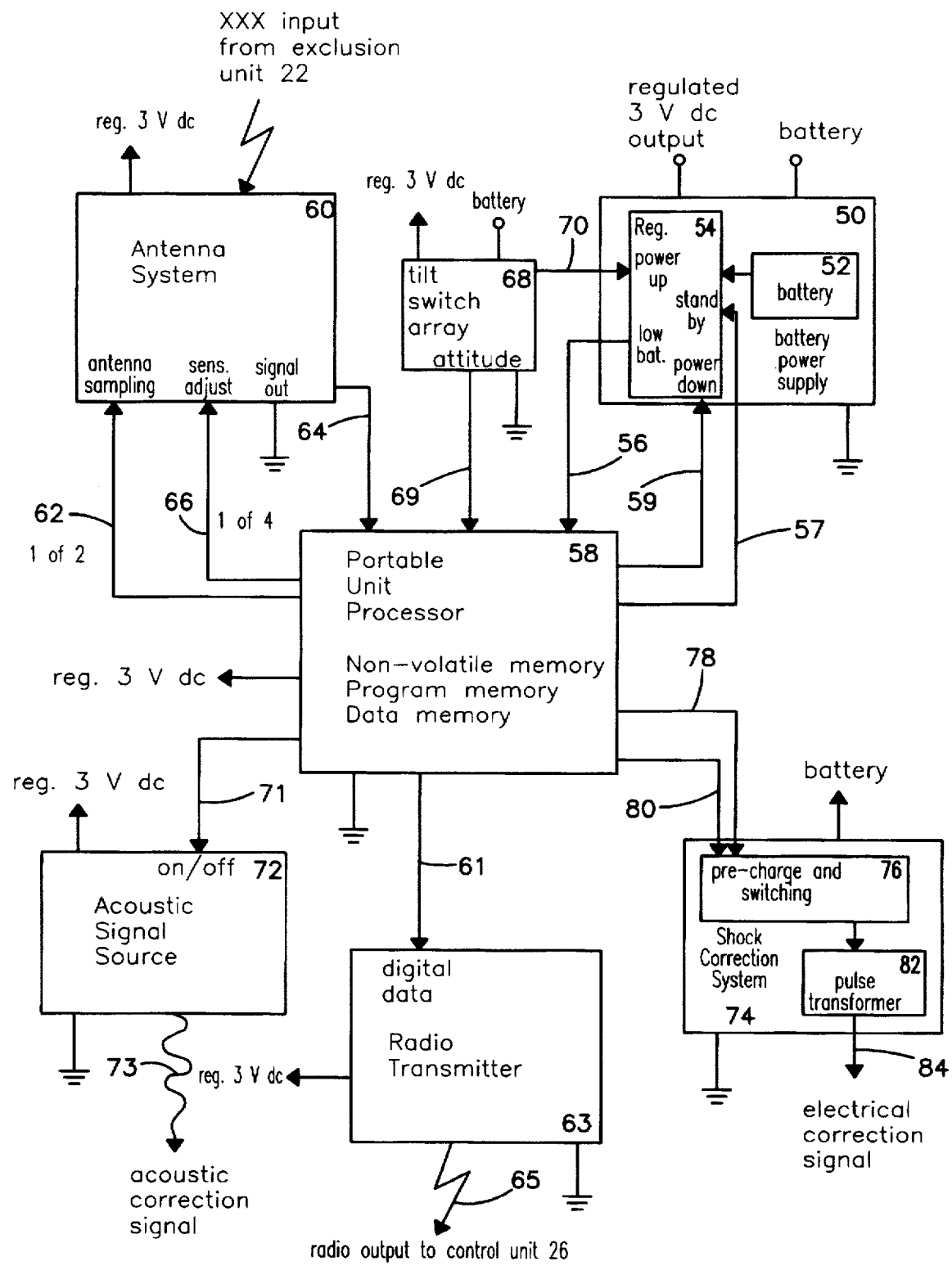
FIG. 3 illustrates a block diagram schematic of a portable unit of an electronic exclusion apparatus.

In FIG. 3, there is illustrated a block diagram of one embodiment of the portable unit 32. Power is applied to the portable unit 32 by the battery power supply 50. The battery power supply 50 includes a battery 52, such as a lithium, coin-shaped battery. A battery 52 of this type advantageously reduces the profile of the portable unit 32 and the period between battery changes. The voltage output from the battery 52 is regulated by a regulator circuit 54, including a regulator such as one from the MICREL 2570 series of regulator chips, so as to give a regulated output of approximately 3 Volts. The regulator circuit 54 ensures that the output from the battery power supply 50 is maintained at approximately 3 Volts, even when the voltage derived from the battery 52 is greater or less than approximately 3 Volts. The regulator circuit 54 detects when the voltage of the battery 52 has fallen below a preselected acceptable level, typically around 1 Volt. When such a low battery voltage condition is detected, the regulator circuit 54 directs a low battery voltage signal 56 to a portable unit processor 58. On receiving the low battery voltage signal 56, the portable unit processor 58 transmits a low battery voltage message over the data line 61 to the radio transmitter 63. The radio transmitter 63 then transmits a low battery voltage message to the control unit 26 to alert the user of the low battery voltage condition of the portable unit 32.

The antenna system 60 preferably includes two orthogonal antennas for detecting the electromagnetic field 34 produced by the exclusion unit 22. The portable unit processor 58 transmits an antenna sampling signal 62 to the antenna system 60 to sample the signals received from each antenna. If more than two antennas are used, the sampling signal selects one antenna from all the antennas present. The portable unit processor 58 may also adjust the sensitivity of the antenna system through use of a sensitivity adjust signal 66, as is described hereinbelow.

A tilt switch array 68, which may be of the ball bearing type, is provided on the portable unit 32. The tilt switch array 68 serves several functions, including the determination of activity of the animal 30, and directing orientation information to the portable unit processor 58 regarding the orientation of the portable unit 32. Since the tilt switches in the tilt switch array 68 are sensitive to movement, the movement of the animal 30 acts to repeatedly switch the tilt switches in the tilt switch array 68 between on and off states. A power-up signal 70 is fed from the tilt switch array 64 to the regulator circuit 54 in the battery power supply 50 in response to this activity. The regulator circuit 54 powers up the regulated approximately 3 Volt output when activity is detected by the tilt switch array 68. When no animal activity has been detected from the tilt switch array 68 for a timeout period, the portable unit processor 58 provides a no-activity signal 59 to power down the regulated approximately 3 Volt output until the activity signal 70 again signals when the tilt switch array 68 senses animal activity and powers up the approximately 3 Volt output. Before powering itself down, the portable unit processor 58 sends a notice of power down over the data line 61 to the radio transmitter 63. The radio transmitter 63 then transmits a notice of power down to the control unit 26 so as not to cause a lost animal alarm. As such, this power conservation scheme results in a greatly extended battery life.

An important aspect of the invention is that the control unit 26 may select an appropriate form of correction given to the animal 30 in response to the distance between the animal 30 and the exclusion unit 22. When the portable unit 32 has detected that the animal 30 is approaching the exclusion unit 22, a signal is transmitted from the portable unit 32 to the control unit 26 by the radio transmitter 63. The transmitted signal indicates the distance separating the animal 30 from the exclusion unit 22. The control unit 26 then determines what kind of correction should be applied to the animal 30 according to the separation distance. For example, the correction may be an acoustic signal, a low-level electric shock, or a high-level electric shock. Once the control unit 26 has selected the applicable correction, the control unit 26 then directs the exclusion unit 22 to generate coded pulses on the electromagnetic field 34 which are received by the antenna system 60 of the portable unit 32. The coded pulses include instructions for correcting the animal 30.

For example, if the instructions received from the control unit 26 indicate that the animal 30 should be corrected by an acoustic alarm, then an alarm signal 71 is directed to an acoustic signal device 72. The acoustic signal device 72 may be an intermittent buzzer, operating at audible frequencies or at ultra-sonic frequencies particularly detectable by the animal 30. If the instructions received from the control unit 26 indicate that the animal 30 should be corrected by the application of an electric shock, then the portable unit processor 58 activates the shock correction system 74. The shock correction system 74 generates an electrical shock signal 84 which is typically applied to the animal by a pair of contact pins. The shock correction system 74 includes a capacitive precharge and switching circuit 76 which is charged according to a precharge signal 78. After a predetermined charging time, the portable unit processor 58 directs a discharge signal 80 to the capacitive precharge and switching circuit 76. The capacitively stored energy is preferably discharged through a pulse transformer 82 to generate an electrical shock signal 84 which is applied to the animal 30. The voltage generated by the capacitive precharge circuit 76 is generally around 30 Volts, and the pulse transformer typically increases the voltage of the electrical shock signal 84 to approximately 1,000 Volts. The duration of the charging cycle determines the amount of charge capacitively stored in the capacitive precharge and switching circuit 76. The intensity of the electrical shock signal 84 applied to the animal 30 may be controlled by selected variation of the duration of the precharge cycle according to instructions received from the control unit 26.

Figure 10:
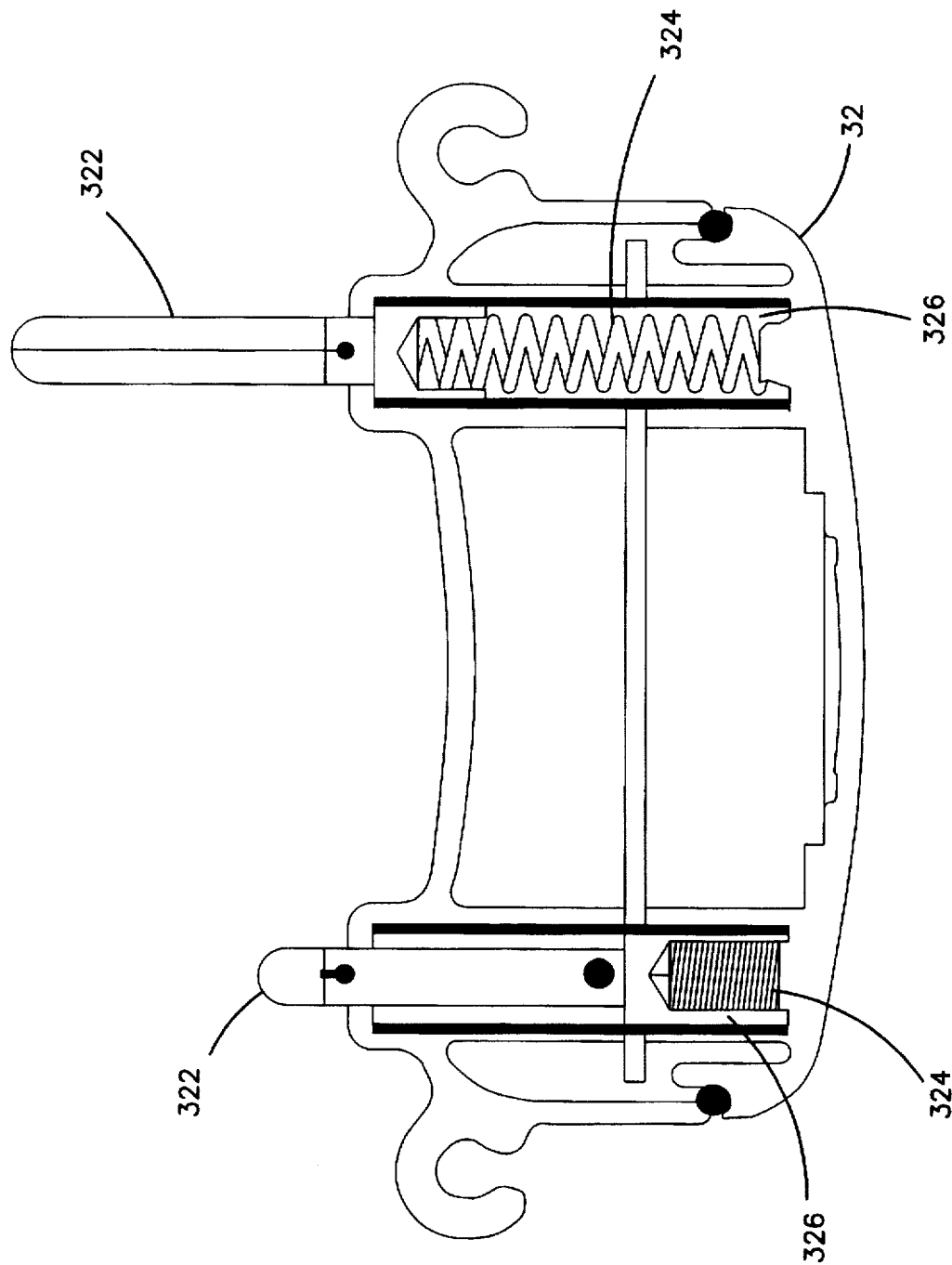
FIG. 10 illustrates a cross-section through a portable unit.

The electrical shock is preferably applied to the animal 30 by a pair of spring-loaded contact pins 322 extending from the portable unit 32. FIG. 10 illustrates a cross section through a typical portable unit 32 where the spring-loaded pins 322 are backed by springs 324 in a well 326 (one contact pin 322 is shown fully extended and the other fully retracted). The use of springs 324 to spring-load the contact pins 322 advantageously allows the spring-loaded contact pins 322 to adjust in length automatically in response to the thickness of the animal's fur or hair. The contact pins 322 may then form an electrical contact with the animal's skin sufficient to close the electrical circuit. The compressibility of the springs 324 is preferably selected to minimize discomfort to the animal 30. The use of spring-loaded contact pins 322 obviates requiring the user to manually replace one pin set with another in order to adapt the pin length to the thickness of the animal's fur or hair, as is the case in conventional devices. The spring-loaded contact pins 322 advantageously maintain consistent contact with the animal 30 when the animal 30 is in motion, or when the animal's body swells during periods of high activity.

An important feature of the present invention is that the control unit 26 is programmed to provide the level of correction to be applied to the animal 30 in response to changes in the separation distance between the animal 30 and the exclusion unit 22. As the animal 30 moves closer to the exclusion unit 22, the level of correction may be increased. For example, the first level of correction applied to the animal on entering zone D may be a soft acoustic correction signal 73 generated by the acoustic signal device 72. As the animal moves closer to the exclusion unit 22, for example into zone C, then a low-level electrical shock signal 84 may be applied by the shock correction system 74. An increased electrical shock signal 84 may be applied as the animal 30 approaches closer to the exclusion unit 22, for example from zone C to zone B. Alternative correction strategies may be programmed into the control unit 26. For example, if the exclusion unit 22 is protecting a piece of furniture, then it may be preferable to supply a low-level acoustic warning when the animal 30 enters zone D, a higher level acoustic warning when the animal 30 enters zone C, a low-level electric shock when the animal 30 enters zone B, and a higher level electric shock when the animal 30 enters zone A. Alternatively, only acoustic correction may be applied to the animal 30, irrespective of how close the animal 30 approaches the exclusion unit 22. Additionally, both an electrical shock signal 84 and an acoustic signal 73 may be applied to the animal 30 simultaneously. This combination may be used for training the animal 30 to respond to an acoustic signal 73.

If the animal 30 approaches within a certain distance of the exclusion unit 22 so as only to initiate an acoustic alarm, but does not retreat from the exclusion unit 22 within an acceptable time, then the control unit 26 may be programmed to direct the portable unit 32 to apply an increased level of correction, such as a low-level electrical shock until the animal 30 retreats from the exclusion area 20.

The portable unit processor 58 is preferably adapted to control the battery power supply 50 so as to reduce the possibility of radio frequency (RF) interference from the regulator circuit 54 interfering with the electromagnetic field 34 detected by the antennas 100 and 102 in the antenna system 60. The portable unit processor 58 turns the regulator circuit 54 off by the regulator stand by signal 57 so as to reduce RF interference. Turning the regulator circuit 54 off results in a loss of regulated voltage applied to the other elements of the portable unit 32. By maintaining an output capacitor across the output of the battery power supply 50 in the portable unit 32, the regulator circuit 54 may be periodically turned off, for example for up to around 2 seconds at a time. After a 2-second off interval, the regulator circuit 54 is reactivated by the regulator standby line 57 and a approximately 3-Volt regulated signal re-applied to each of the elements in the portable unit 32, so as to recharge the input capacitors.

Figure 4:
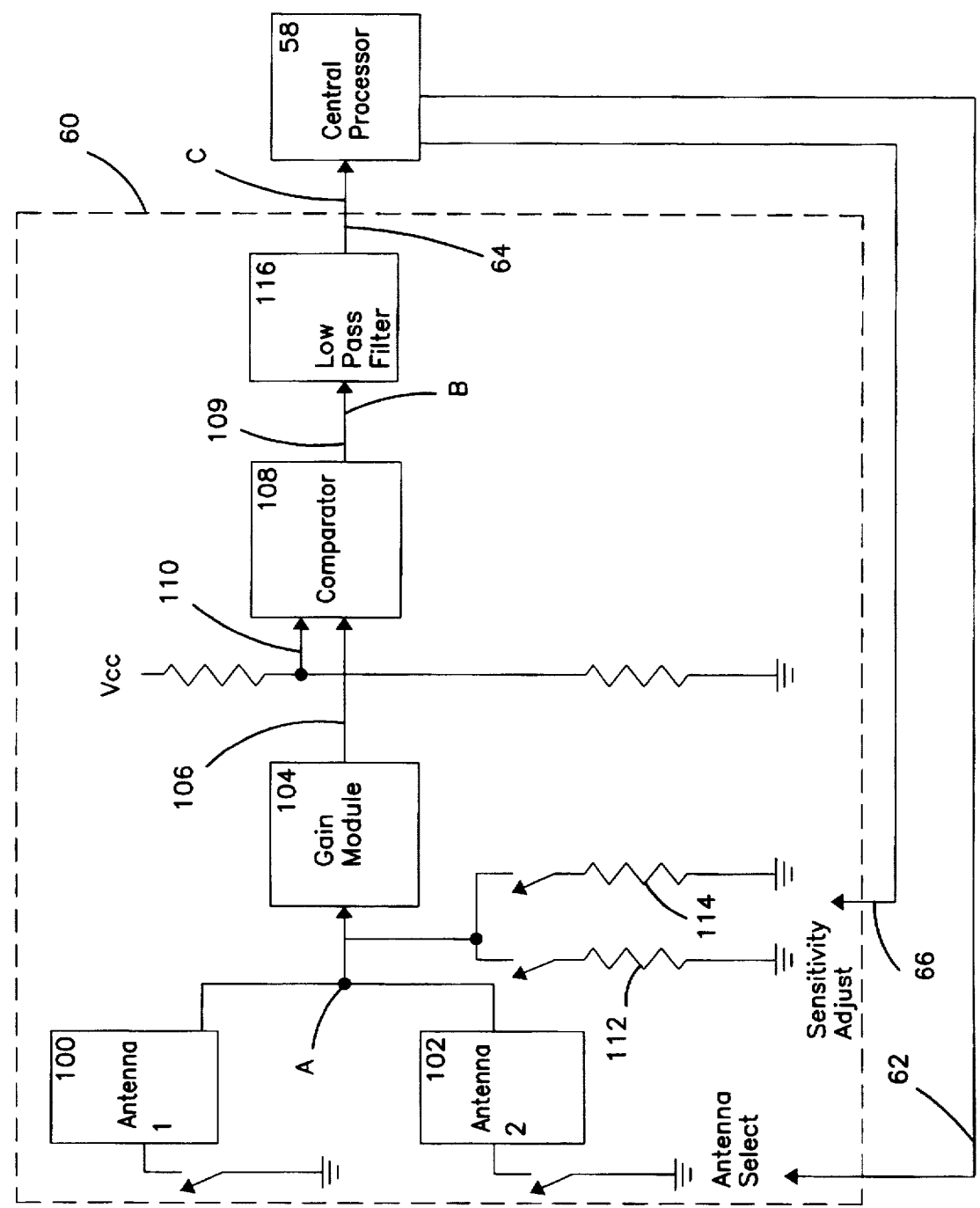
FIG. 4 illustrates a block diagram schematic of an antenna system provided in a portable unit.

FIG. 4 illustrates a block schematic diagram of the antenna system 60. Two antennas 100 and 102 are illustrated, but three or more may also be used. Antenna one 100 and antenna two 102 are preferably oriented so that their respective directions of maximum sensitivity are orthogonal.

Each of the antennas is selected in sequence by the antenna select signal 62 received from the portable unit processor 58. The output A from the antenna thus selected is directed through a signal attenuator formed by switchable resistors 112 and 114 coupled to a gain module 104. The gain module 104 typically includes an operational amplifier operating in the linear region. The output 106 from the gain module 104 is directed to a comparator 108 which compares the gain module output 106 with a reference signal voltage 110. The sensitivity adjust signal 66 selects programmable resistors 112 and 114 in the signal attenuator so as to vary the amplitude of the input to the gain module 104. The use of two programmable resistors 112 and 114 results in four sensitivity settings for the gain module output, resulting in a comparator 108 output 109 indicative of the levels of electromagnetic field shown as 36, 38, 40 and 42 around the exclusion unit 22. When the comparator output 109 is active, even though the programmable resistors 112 and 114 are switched so as to produce the smallest gain module output 106, then the animal has entered zone A, closest to the exclusion unit 22. If, on the other hand, there is a zero output signal 109 from the comparator 108 for all levels of gain module output signal 106, the animal 30 is assumed to be outside the exclusion area 20, i.e. in zone E. An alternative approach to determining in which zone the animal 30 is located is to maintain the input to the gain module 104 with a single sensitivity and to sample different reference voltages 110. In another alternative approach, the programmable signal attenuator, including the switchable resistors 112 and 114, and the comparator 108 may be included with the portable unit processor 58 in a single chip.

The comparator output 109 is directed to a low pass filter 116. The output from the low pass filter 116 is directed to the portable unit processor 58 as the data out signal 64.

Once the portable unit processor 58 has processed the data out signal 64 from the antenna system 60, the appropriate information data packet is transferred to the radio transmitter 61 for transmission to the control unit 26. The information packet transmitted by the radio transmitter 61 typically includes a code identifying which portable unit 32 transmitted the signal and data indicating in which zone the portable unit 32 is currently located.

Figure 5:
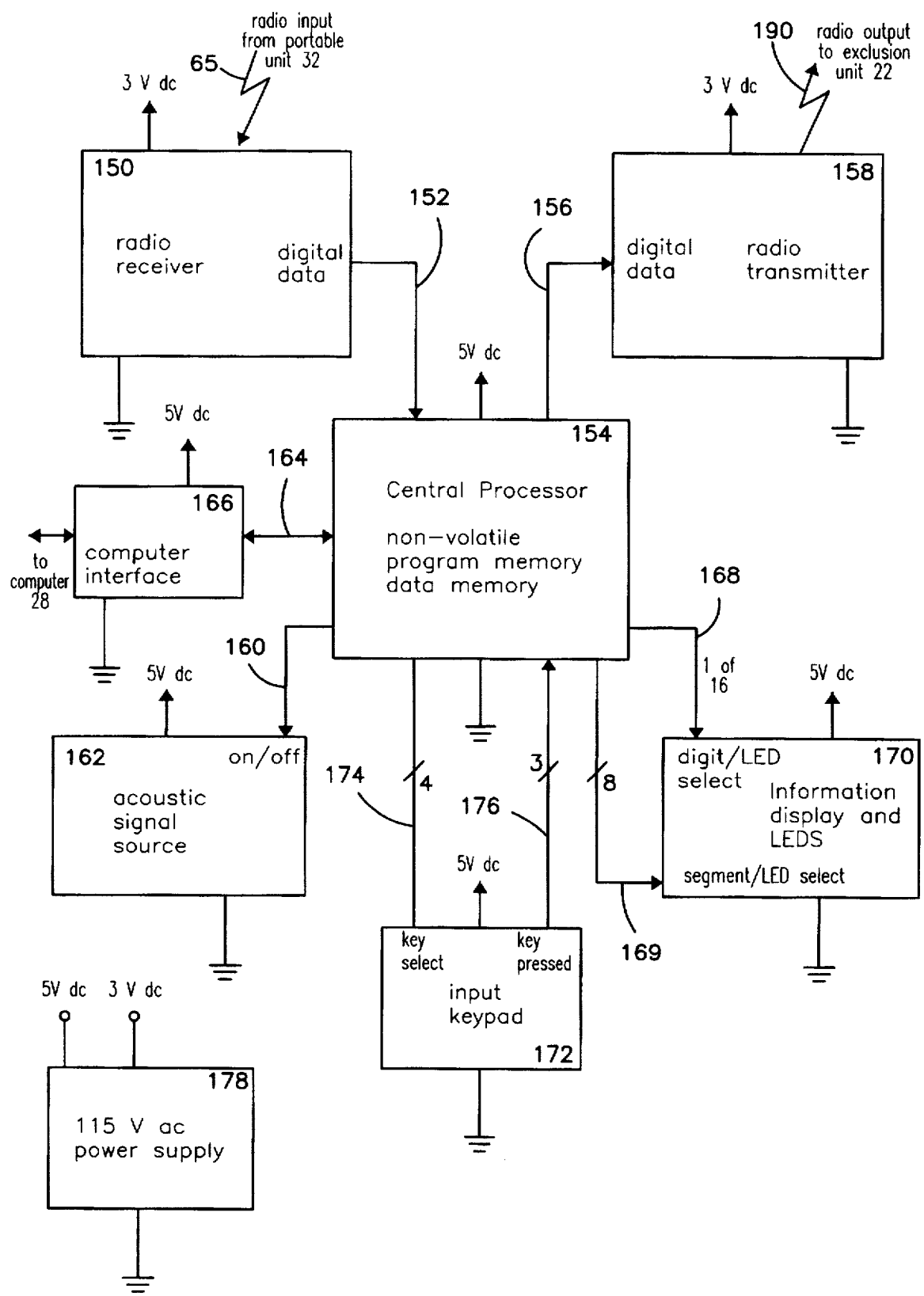
FIG. 5 illustrates a block diagram schematic of a controller unit of an electronic exclusion apparatus.

A block diagram schematic of the control unit 26 is illustrated in FIG. 5. The radio signals 65 transmitted by the radio transmitter 63 in the portable unit 32 are received by the radio receiver 150 in the control unit 26. The radio signals are decoded and the data transferred via the data input line 152 to the central processor 154.

The central processor 154 includes non-volatile memory, program memory, and data memory, and controls operating functions of the animal control apparatus 19.

When the portable unit 32 determines that the animal 30 has entered one of the zones A–D in the exclusion unit 22, the portable unit 32 identifies which zone the animal 30 is located in and transmitting identification codes to the control unit 26 identifying which exclusion unit 22 generated the electromagnetic field 34 which was detected and the portable unit 32 transmitting the message. The central processor 154 in the control unit 26 includes non-volatile memory so that the user may program the animal control apparatus 19 to provide different levels of correction according to which zone A–D the animal 30 has entered or, alternatively, to provide no correction at all for the animal 30 on entering the exclusion area 20. When the central processor 154 receives the zone information from the portable unit 32, the central processor 154 transmits a correction instruction appropriate to the zone currently occupied by the animal 30. The correction instruction is directed to the radio transmitter 158 via the data output line 156. The radio transmitter 158 transmits the instructions to the exclusion unit 22 which then encodes correction commands modulated on the electromagnetic field 34, as discussed hereinbelow. After the portable unit 32 receives and decodes these correction commands, the desired correction is applied to the animal 30.

The control unit 26 may control the operation of a number of exclusion units 22 and 23, allowing the user to control the movement of one or more animals by employing a number of exclusion areas 20 and 21. Thus, the user may position exclusion units 22 at several doorways through the house so as to allow the animal 30 to range within several rooms.

If the radio transmitter 63 of the portable unit 32 transmits a low battery voltage signal to the control unit 26, the central processor 154 may warn the user of the low battery condition by directing a low battery voltage signal to the information display 170 through one of the LED select lines 168 and 169.

The central processor 154 monitors the distance between the animal 30 and the exclusion unit 22 by monitoring which zone is occupied by the animal 30. The central processor 154 may be programmed to increase the level of correction to the animal 30 if the animal 30 does not move away from the exclusion unit 22 in a timely manner, for example within about 3–5 seconds of correction starting. Increasing the level of correction includes changing the sound of the acoustic signal, changing from an acoustic signal to an electrical shock signal, and increasing the intensity of the electrical shock signal. Additionally, the central processor 154 may measure the time for the animal 30 to move from one zone to the next and, if it determines that the animal is approaching the exclusion area 20 above a preselected speed, the central processor 154 may apply a level of correction higher than would be applied if the animal 30 were approaching the exclusion area 20 at a lower speed.

The central processor 154 may further be programmed to cease the application of correction if the animal 30 does not respond to the increased level of correction within a certain time, for example approximately 10 seconds, since the animal 30 may be caught in the zone and be unable to move away from the exclusion unit 22. Following a rest period of approximately 10 seconds, correction may then be reapplied for another period of approximately 10 seconds. If the animal 30 still does not move out of the exclusion zone 20, then correction ceases and the central processor 154 may then warn the user that the animal has become caught close to the exclusion unit 22. The user may be warned through one of the acoustical signal source 162, the information display 170, and a warning directed to the computer 28 through the computer interface 166.

The control unit 26 may be used to create an historical log of the encounters of the animal 30 with the exclusion unit 22. This is preferably achieved by connecting the control unit 26 to a computer 28 via the computer interface 166, and transferring information from the central processor 154 to the computer 28 for storage. Such historical information may include the time of an incursion event, the zone which the animal 30 penetrated and the correction strategy employed.

Whenever the portable unit 32 is not in a powered-down mode, it transmits a regular handshake signal to the control unit 26 to confirm that the portable unit 32 is operative. Failure by the control unit 26 to receive a regular handshake signal within a preselected timeout period, and without receiving a power-down notice from the portable unit 32, may result in a warning to the user that the portable unit 32 is faulty, or that the animal 30 is lost.

The pet control apparatus 19 may be used for containing more than one animal at a time, and may be programmed to provide customized levels of correction to a number of animals. The central processor 154 is programmable to determine a level of correction according to the zone the animal 30 enters and which particular portable unit 32 is associated with a specific animal 30.

For example, the central processor 154 may be programmed to provide high levels of correction to a disobedient animal or one which is at an early training stage, so that an electrical shock correction is applied whenever the animal reaches any zone within the exclusion zone 20. The central processor may be programmed to command electrical shocks of increasing intensity as the animal 30 approaches the exclusion unit 22. The central processor 154 may also be programmed to respond differently to a second animal which, for example, is well trained or unable to withstand severe correction. The central processor 154, for example, may be programmed to command only an audible warning to the second animal, irrespective of how closely the second animal approaches the exclusion unit 22. Alternatively, the central processor 154 may be programmed to permit the second animal to pass through a first exclusion zone 20, for example allowing the second animal to move from one room to a second room, while barring a first animal from entering the exclusion zone 20. The central processor 154 may also be programmed to exclude both the first and second animals from a second exclusion area 21 generated by a second exclusion unit 23.

The correction strategy for each animal is updatable by reprogramming the non-volatile memory in the central processor 154. For example, a young animal being introduced to the animal control system 19 may initially require high levels of correction, but the programmed correction levels may be changed so as to reduce the level of correction necessary to keep the animal within the bounds of the system 19 as the animal 30 becomes trained. In order for the control unit 26 to determine which animal of a number of animals is approaching the exclusion unit 22, each portable unit 32 is provided with a unique identifying code which is transmitted to the central processor 154. The control unit 26 is thus able to establish which animal 30 approaches the exclusion unit 22.

An input keypad 172 may be provided to facilitate programming of the operational characteristics by the user. The input keypad 172 is connected to the central processor via key select lines 174 and key pressed lines 176. A user may employ the input keypad 172 for entering such information as, for example, the levels of correction associated with each portable unit 32 for each zone (including acoustic or electric correction, or no applied correction), or the length of time that correction is applied to the animal 30 in a single zone before increasing to a next level of correction, or ceasing correction altogether.

The computer interface 166 permits connection of the pet control apparatus 19 to a computer 28 for remote control and monitoring of the pet control apparatus 19 and for logging activity of the animal 30. For example, user-friendly control software may be provided on the computer 28 to allow the user to remotely program the control unit 26, rather than using the input keypad 172. Monitoring software provided on the computer 28 may allow the user to record the activity of the animal 30, including periods of inactivity and incursions to the exclusion zones 20 and 21. The monitoring software may also allow an automatic alarm signal to be sent via telephone line to a remote location when specific events occur, such as loss of contact with a portable unit 32.

The control unit 26 is provided with a power supply 178 to provide power to all the control unit's components at appropriate voltage levels.

The control unit 26 may be configured to catch certain information, such as a low battery warning or a missing portable unit 32, so that such information is not lost in the event that power to the control unit 26 is shut off.

Figure 6:
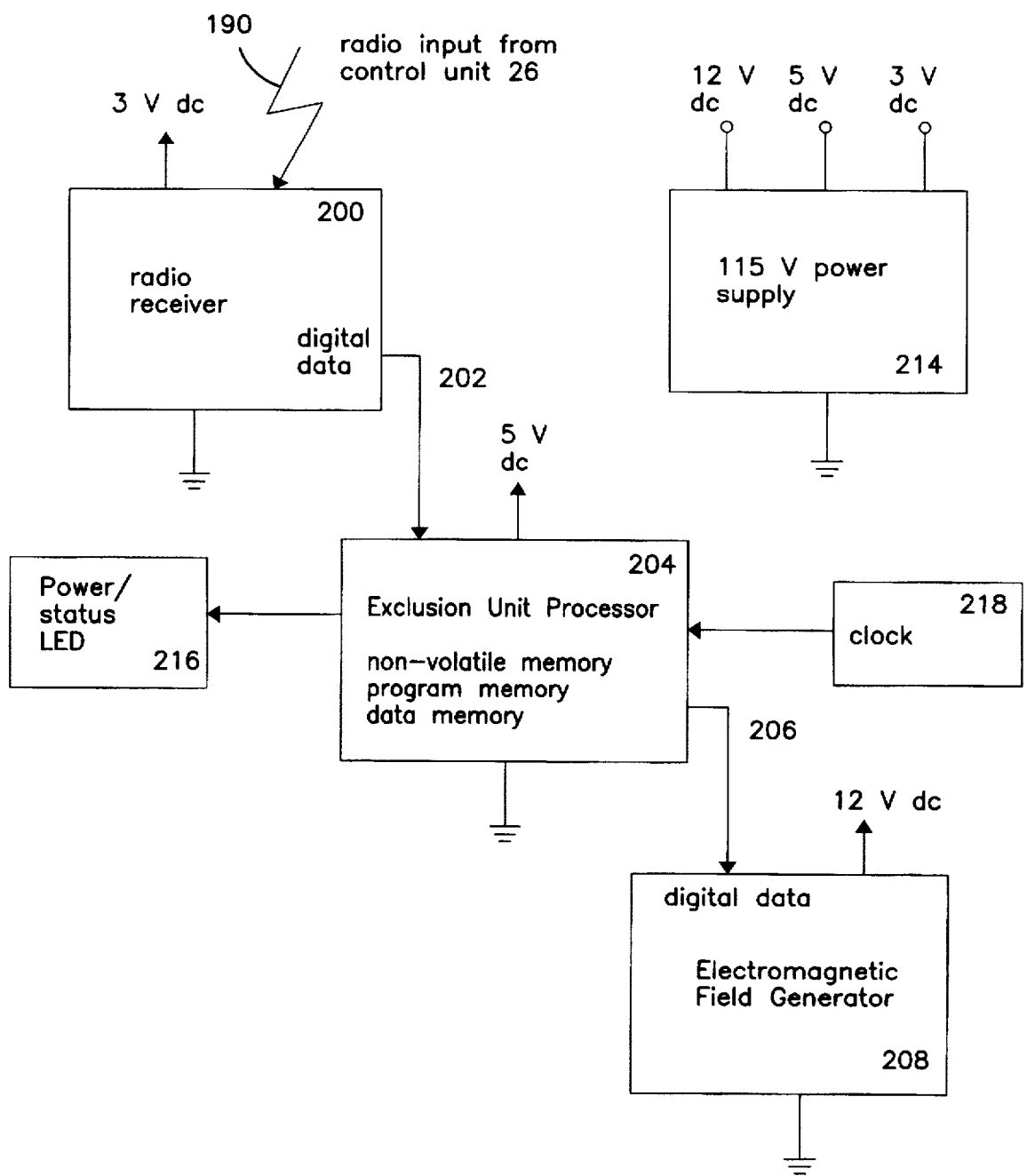
FIG. 6 illustrates a block diagram schematic of an exclusion unit of an electronic exclusion apparatus.

FIG. 6 illustrates a block diagram schematic of the exclusion unit 22. A radio receiver 200 receives control signals 190 transmitted from the control unit 26. The received control signals are directed on control signal line 202 to the exclusion unit processor 204 where the received control signals are processed. After processing, the exclusion unit processor 204 directs control signals 206 to the electromagnetic field generator 208 which produces the electromagnetic field 34.

The exclusion unit 22 is provided with a power supply 214 which preferably generates three separate DC voltage levels. The approximately 3 Volt DC level is used for powering the radio receiver 200. The 5 Volt DC level is used in powering the central processor 204. The electromagnetic field generator 208 is typically powered at a 12 Volt DC level. A power/status LED display 216 may indicate the present power status, for example whether the power unit is functioning normally or to indicate that there is an exclusion unit processor 204 fault, or that there is no power.

Figure 7:
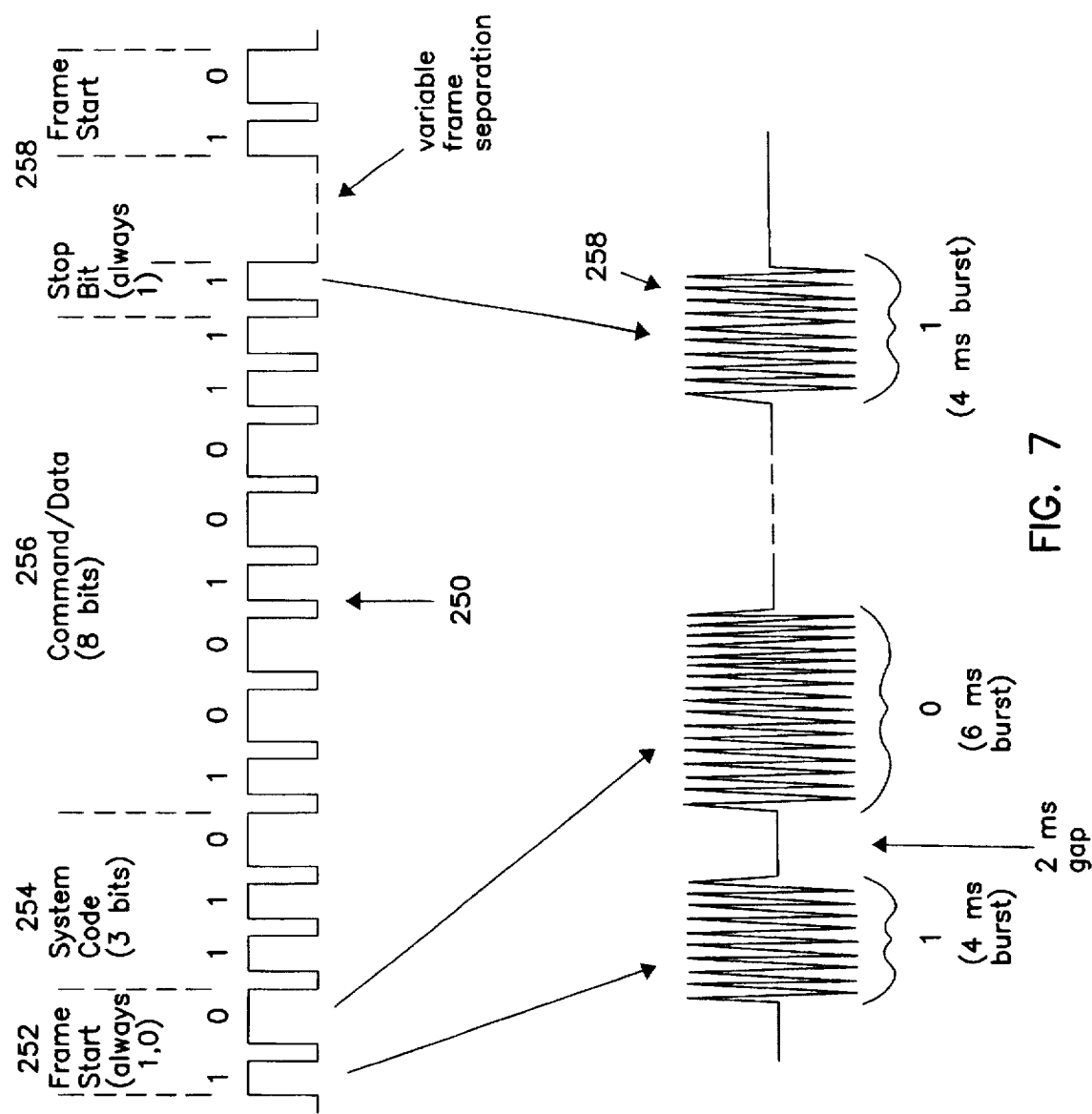
FIG. 7 illustrates waveforms generated by an exclusion unit.

The modulated electromagnetic field 34 generated by the exclusion unit 22 and detected by the portable unit 32 is discussed with reference to FIGS. 7 and 8A–8B. The electromagnetic field 34 is time-encoded with information, such as data or commands, from the control unit 26.

The following discussion describes, an approach in accordance with one embodiment, to modulating the electromagnetic field 34 for information transfer from the control unit 26 to the portable unit 32, although other approaches may be employed. FIG. 7 illustrates the signal transmitted by the exclusion unit 22. The signal includes a frame 250, where the frame is a binary word having four distinct components. The first component is the frame start 252 which includes a "1" and a "0". The second component is the system code, typically comprising three bits, and which indicates a code number related to the control unit 26. The system code 254 is used, for example, to distinguish between different pet control systems operating in adjacent apartments. Following the system code 254 is the command data component 256, typically comprising 8 bits. The command data component 256 may include a header indicating which portable unit 32 out of a plurality of portable units the following command is directed to. The remainder of the command data component 256 includes an identification of which exclusion unit 22 out of a number of exclusion units is transmitting the frame 250, and the instructions for the particular portable unit 32, such as correction commands. The final component of the frame is stop bit 258, which is a "1" followed by a variable dormant period.

The digits in the binary frame 250 are produced by burst width modulation of burst of electromagnetic field reversals having a period of 10 kHz. For example, a "1" may typically be represented by a 4 millisecond burst at 10 kHz, and "0" may typically be represented by a 6 millisecond burst at 10 kHz. The standard separation between bits is 2 milliseconds. The length of the frame 250 can vary, depending on the number of zeros present in the frame 250. The separation between adjacent frames may be varied so that the time lapse between frame starts is constant from one frame to the next. It is understood that the frequency of the bursts may be at frequencies other than 10 kHz.

Figure 8A:
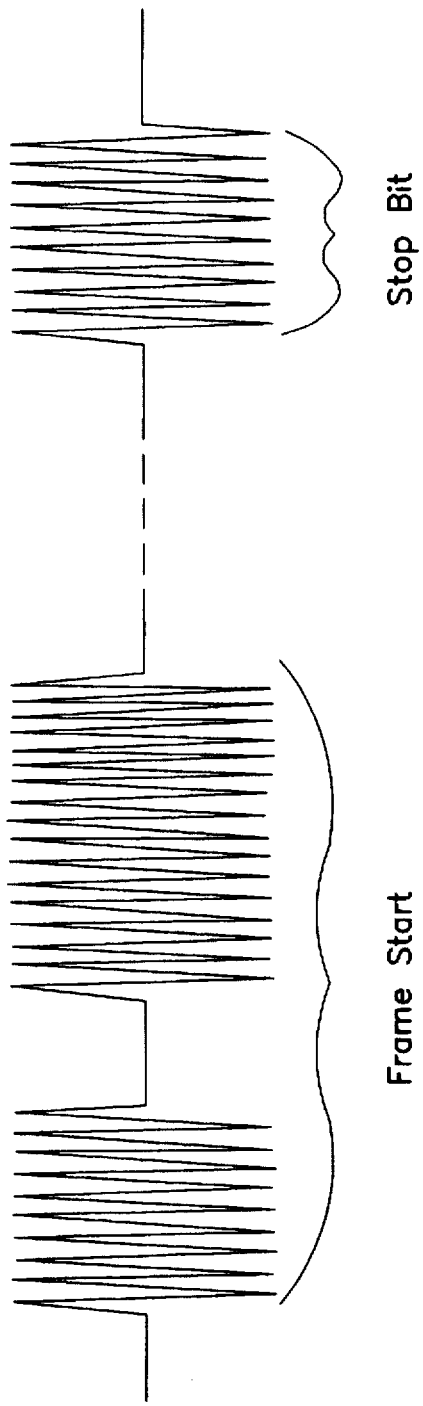
FIGS. 8A–8B illustrate waveforms detected and analyzed by a portable unit.
Figure 8B:
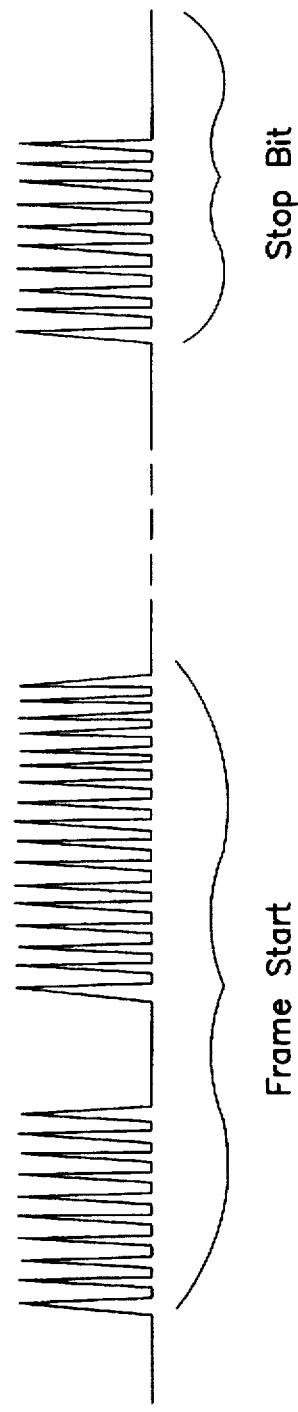

FIG. 8A illustrates a portion of the signal received by one of the antennas 100 and 102, as would be detected at position A in FIG. 4. FIG. 8B shows the same signal once it has been transmitted through the comparator 108, at point B. The comparator 108 produces a logic high whenever the incoming signal is above the reference signal voltage 110. The signal of FIG. 8B is then passed through a low pass filter to remove the 10 kHz carrier frequency, and is decoded by the portable unit processor 58. Changing the sensitivity using resistors 112 and 114 results in the signal shown in FIG. 6 growing or shrinking in amplitude. If the animal 30 is sufficiently far away and does not register in a particular zone, the signal in FIG. 8b is flat (zero level).

Figure 9:
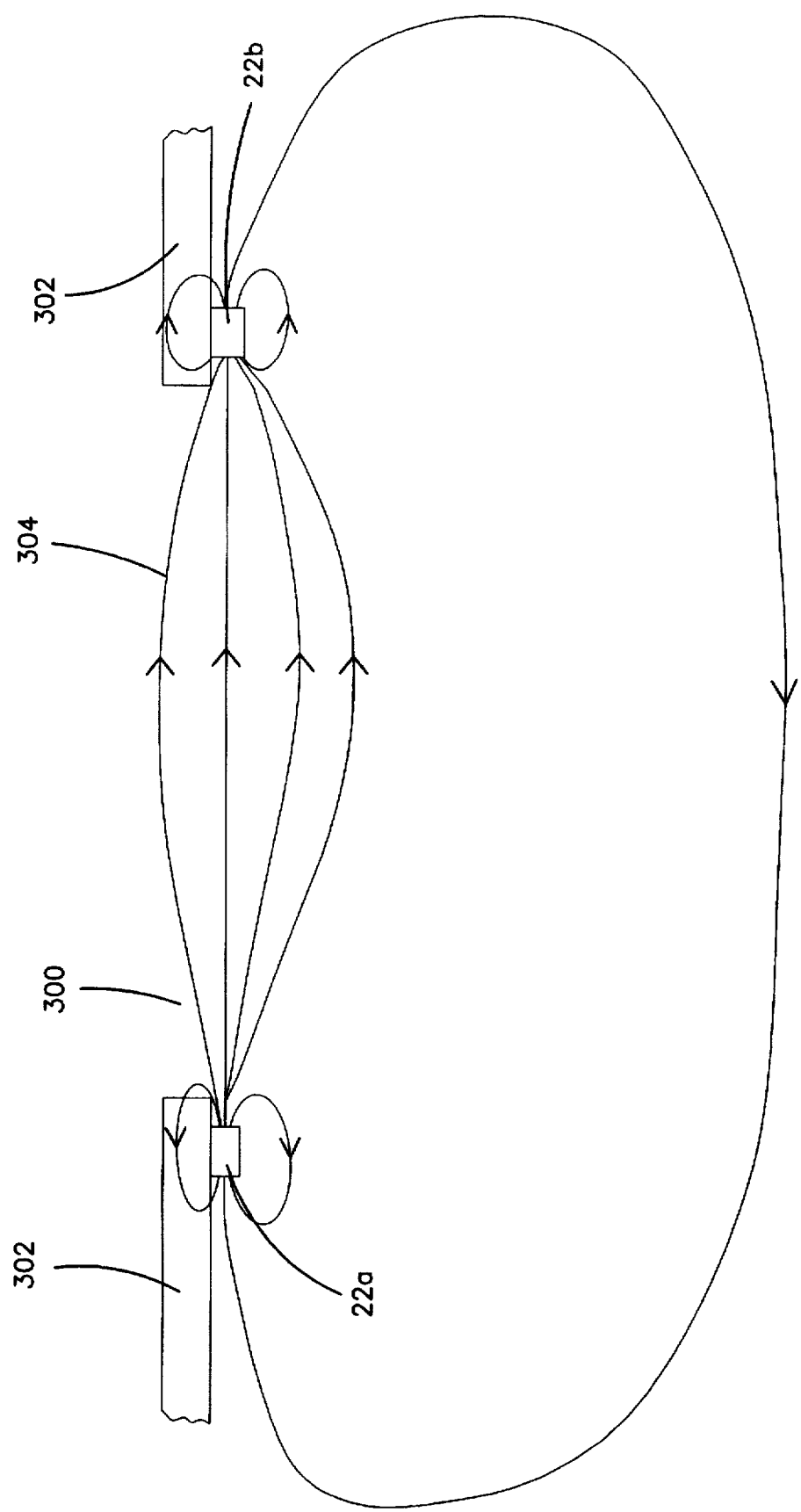
FIG. 9 illustrates two exclusion units operating in tandem.

Referring now to FIG. 9, two exclusion units, 22a and 22b, may be used in combination to provide an exclusion area across a wide opening, where a single exclusion unit operating alone is not able to provide an exclusion area sufficiently large as to cover the whole opening. Such an opening may be an archway, as is typically found between a living room and a dining room in many houses. The opening 300 is positioned between opposing wall sections 302. The first exclusion unit 22a is positioned on the left side of the opening 300 and the second exclusion unit 22b is positioned on the right side of the opening 300. The electromagnetic fields radiated into the opening 300 by the exclusion units 22a and 22b are preferably synchronized to be out of phase with each other by 180°. Thus, as the first exclusion unit 22a radiates a first polarity into the opening 300, the second exclusion unit 22b radiates the opposite polarity into the opening 300. Preferably the two exclusion units 22a and 22b are synchronized to present oppositely polarized electromagnetic fields to each other, so that the combined electromagnetic field 304 reaches across the opening 300 between the two exclusion units 22a and 22b.

The exclusion units 22a and 22b may operate in synchronism where each is provided with a high frequency clock 218, such as a quartz clock, for running the respective exclusion unit processors 204, and by initializing the exclusion units 22a and 22b to operate together. For example, during an initial setup, the exclusion units 22a and 22b may be programmed to operate from the same control signal 190 received from the control unit 26, and for both to generate an electromagnetic signal following, for example, a selected number of cycles of the clock 218 after receipt of the control signal 190. The first exclusion unit 22a may be programmed to generate its electromagnetic signal starting with a first polarity, while the second exclusion unit 22b is programmed to generate its electromagnetic signal starting with the opposite polarity. Such a system relies on the clocks 218 in each exclusion unit 22a and 22b keeping close time so as to commence transmission of each frame 250 in synchronism, and to maintain synchronism throughout the duration of the frame 250. Thus, in such an approach, the clock may be regarded as being a synchronization circuit.

Other schemes for operating the two exclusion units 22a and 22b in synchronism include a master/slave approach, where, for example, exclusion unit 22a operates as a master and the exclusion unit 22b operates as a slave. The electromagnetic signal generated by the slave exclusion unit 22b is thus slaved to the electromagnetic signal generated by the master exclusion unit 22a to ensure synchronism. This approach requires transmission of a synchronization signal from the master exclusion unit 22a to the slave exclusion unit 22b using, for example, a radio transmitter or an infrared transmitter or the electromagnetic signal 34 generated by the master exclusion unit 22a.

Figure 11:
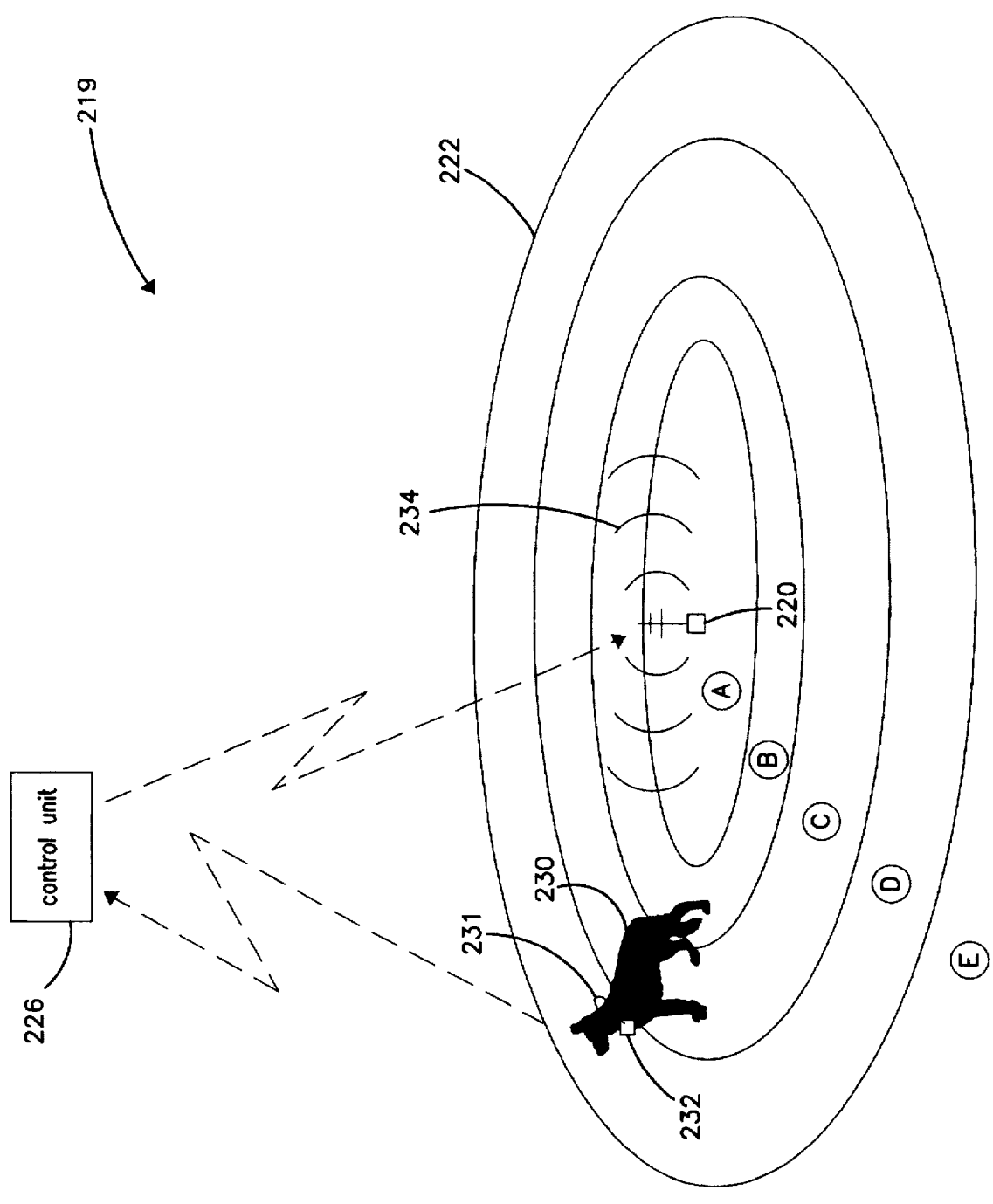
FIG. 11 illustrates an apparatus for providing electronic confinement of animals according to the principles of the present invention.

Another embodiment of the invention, illustrated in FIG. 11, operates on an alternative principle, as discussed in U.S. Pat. No. 5,067,441 which is incorporated herein by reference, where the animal 230 is given increasing correction as it moves away from a transmitter 220, rather than when moving towards a transmitter. This approach results in confining the animal 230 to a confinement area 222, rather than excluding the animal 230 from an exclusion area 22. The animal control system 219 includes a portable unit 232 on the animal, a control unit 226 and a transmitting unit 220. The transmitting unit 220 transmits an electromagnetic signal 234. The strength of the electromagnetic signal 234 received by the portable unit 232 reduces as the animal 230 moves away from the transmitter 220. The portable unit reports the strength of the detected electromagnetic signal 234 to the control unit 226, which is programmed to determine a degree of correction to be applied to the animal 230 in response to the separation between the animal 230 and the transmitter 220. The control unit 226 transmits control information to the transmitter 220, and the control information is then retransmitted by the transmitter 220 on the electromagnetic signals 234 to be detected by the portable unit 232.

The portable unit 232 is similar to that shown in FIGS. 3 and 4, except that the antennas 100 and 102 are tuned to the frequency of the electromagnetic signal 234 transmitted by the transmitter 220. The portable unit may be programmed to provide correction to the animal 230 when no signal 234 is detected, indicating that the animal 230 has left the confinement area 222. Such correction may be terminated if the animal 230 has not returned to the confinement area 222 within a timeout time, since the animal 230 may have become trapped and be unable to re-enter the confinement area 222.

The control unit 226 is similar to that shown in FIG. 5, except that it is programmed to generate a correction signal when the detected electromagnetic signal 234 reduces in amplitude, rather than increases. For example, the control unit 226 may be programmed to provide an acoustic correction signal to the animal 230 when it passes from zone A to zone B, and increasing levels of electric shock correction when it passes from zone B to zone C and from zone C to zone D. The control unit 226 is programmable to control the movement of more than one animal within the confinement area 222 around the transmitter 220, so that different animals may receive different levels of correction for a given separation distance from the transmitter 220. In addition, the control unit 26 may control more than one transmitter 220 in the animal control system 19. Multiple transmitters 220 may have overlapping confinement areas 222, so that the animal 30 may pass from one confinement area 222 to the next, and thus enjoy a greater range of freedom, without receiving correction. Alternatively, multiple confinement areas 222 may be separated so that animals 230 may be confined to their respective confinement areas 222 without being able to pass to a neighboring confinement area 222.

Figure 12:
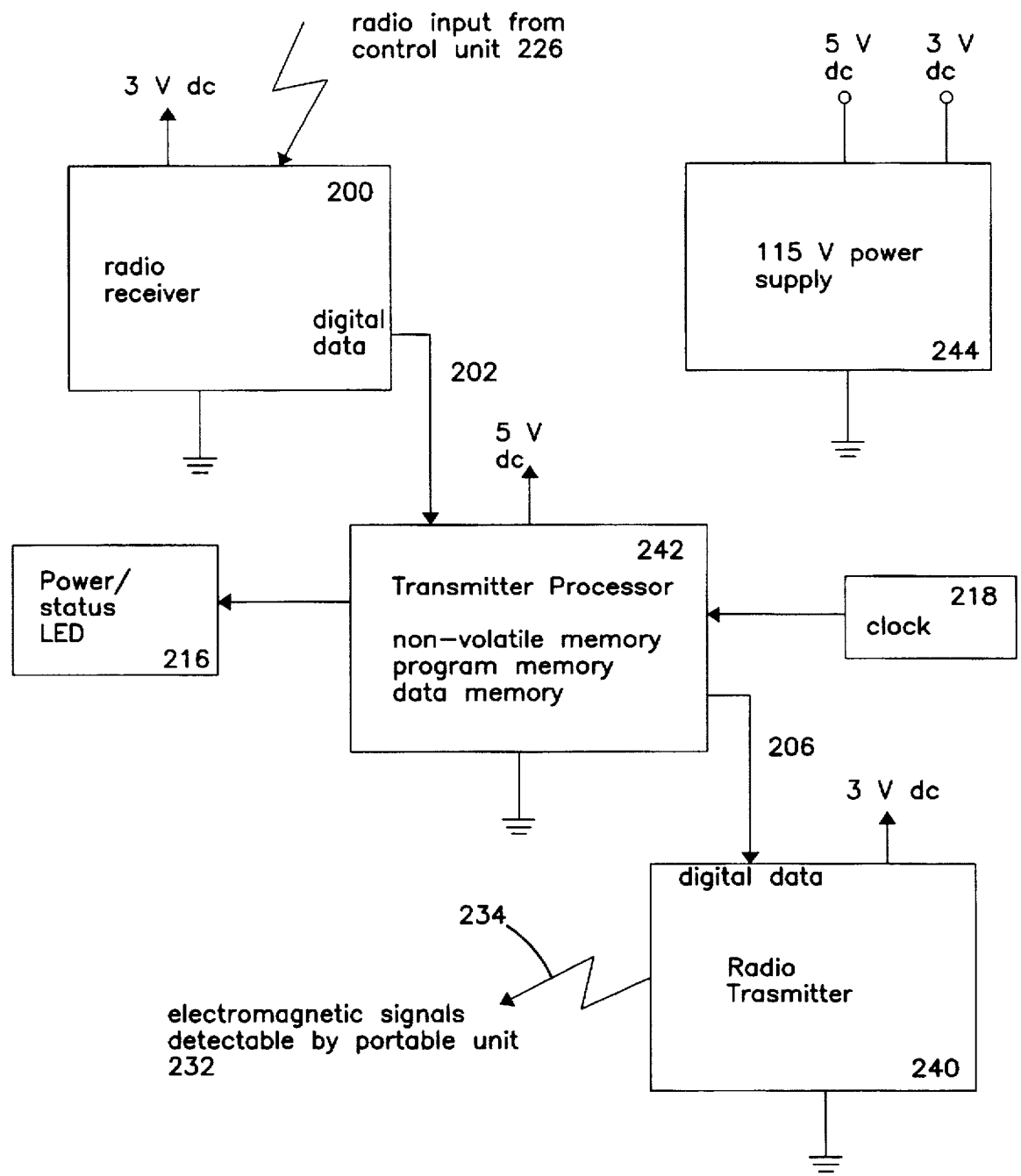
FIG. 12 illustrates a block diagram schematic of a transmitter unit of an electronic confinement apparatus.

The transmitter 220 is illustrated in FIG. 12. The transmitter 220 is related to the exclusion unit 22 illustrated in FIG. 6. A radio receiver 200 receives input transmitted by the control unit 226, and the received digital data 202 thus received are passed to the transmitter processor 242. The transmitter processor decodes the signals received from the control unit 226 and directs the radio transmitter 240 to transmit electromagnetic signals 234 with instructions for the portable unit 232 encoded thereon. The transmitter 220 may be provided with a power/status LED 216 to inform the user of the power status, or useful information. The transmitter processor 242 may be driven by a clock 218, such as a quartz clock. The power supply 244 provides D.C. voltage levels for powering the components of the transmitter 220, for example a 5 V level for the transmitter processor 242 and approximately a 3 V level for powering the radio receiver 200 and the radio transmitter 240.

The portable unit 32 may be attached to the animal 30 by any method which ensures that contact is maintained between the contact pins 322 and the animal's skin. The method of attaching the portable unit 32 to the animal 30. Prior approaches have employed a webbing collar, to which the collar unit is attached, and placing the collar on the animal's neck.

Figure 13:
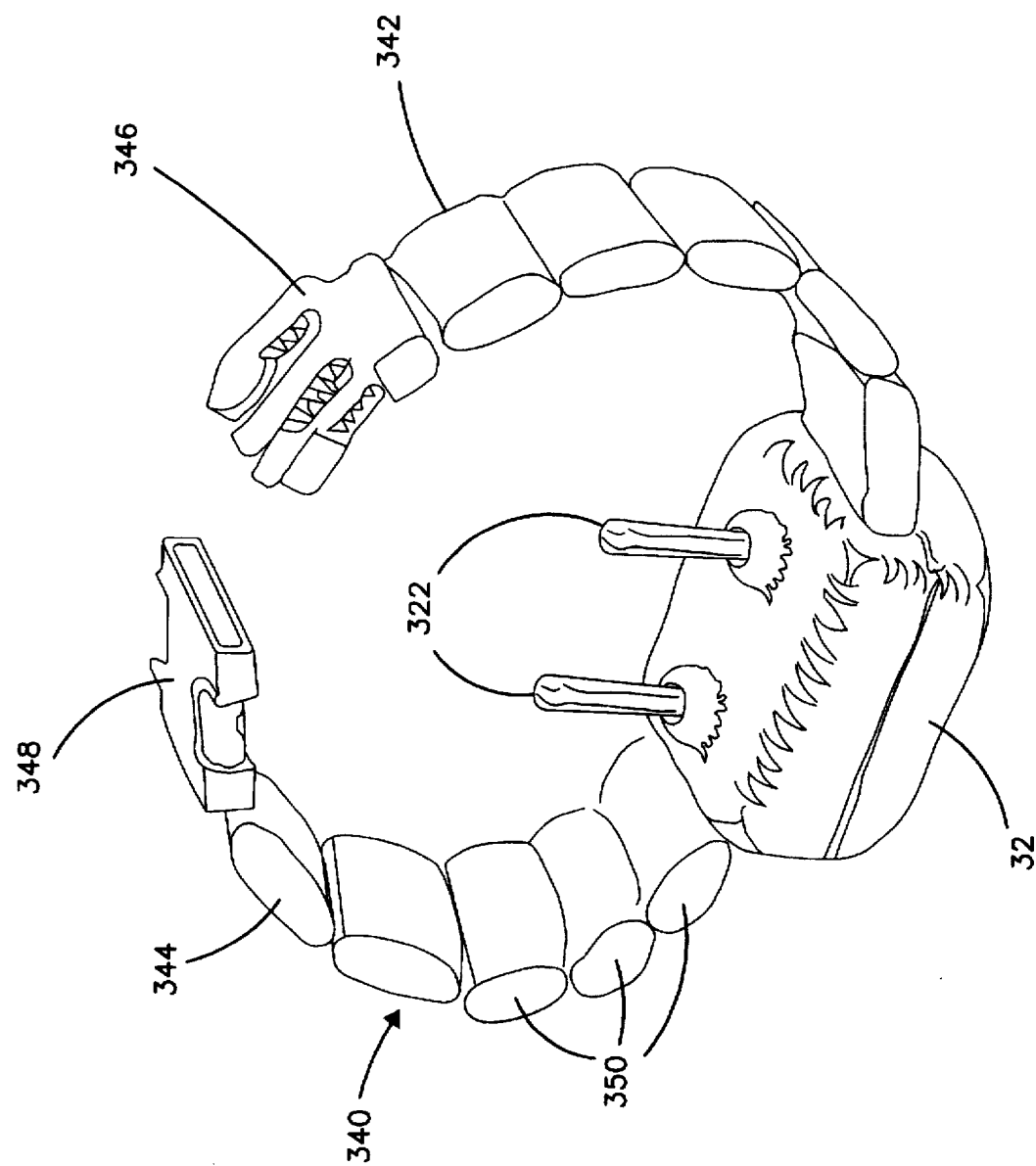
FIG. 13 illustrates a segmented collar for a portable unit.
Figure 14:
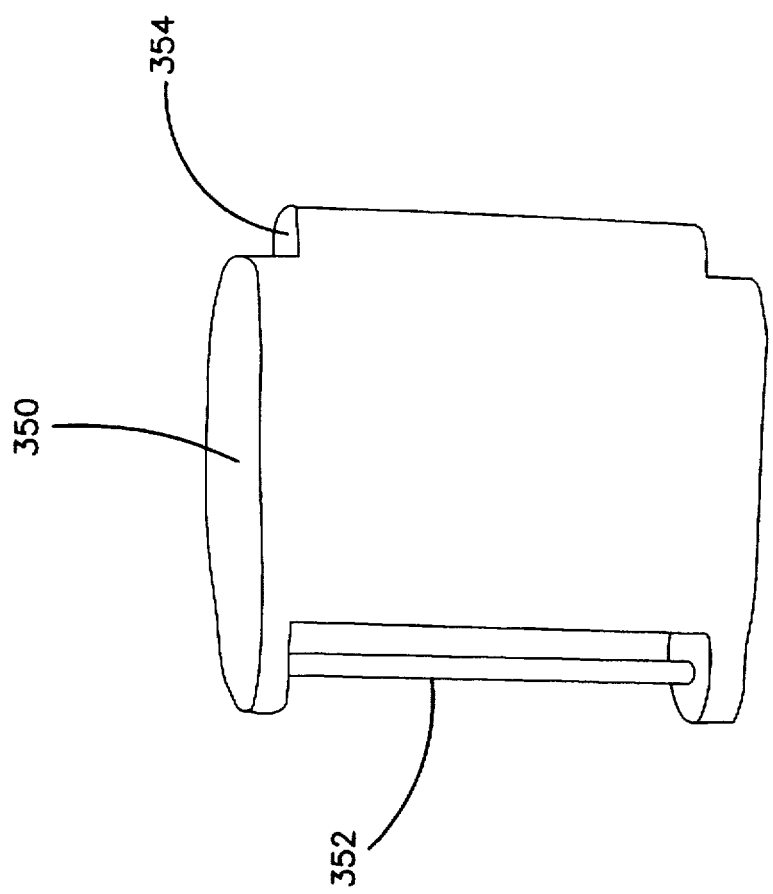
FIG. 14 illustrates a segment for a segmented collar.

An alternative approach, illustrated in FIG. 13 is to use a segmented strap, such as a segmented collar 340 attached to the portable unit 32. The segmented collar 340 may include two parts 342 and 344, where the first part 342 is terminated at one end by an insertion portion 346 and the second part 344 is terminated at one end by a receptacle portion 348. The insertion portion 346 and the receptacle portion 348 may be of a familiar type of plastic buckle. The other ends of the first and second parts 342 are attached to either side of the portable unit 32. Each part 342 and 344 is formed from a series of connectable segments 350 made, for example, from molded plastic. The segments 350 are formed to allow a user to assemble the first and second parts 342 and 344 by fitting one segment 350 into another. This allows the user to adjust the lengths of the first and second parts 342 and 344 to form a close fitting collar 340 when the insertion portion 346 and the receptacle portion 348 are joined. Adjacent segments 350 may "snap fit" together so as to provide hinged attachment therebetween. One approach to forming attachable segments, illustrated in FIG. 14, is to provide a segment 350 with a bar 352 along a portion of one side and a hooked portion 354 along a complementary portion of the other side. The hooked portion 354 of a first segment 350 may snappingly fit over the bar of an adjacent segment 350 so as to provide hinged attachment between adjacent segments 350.

A segmented collar 340 of this sort advantageously provides support to the maintain the portable unit 32 in position and orientation against the animal 30 so as to maintain electrical contact between the contact pins 322 and the animal's skin. The segmented collar 340 also provides the user with a wide range of adjustment in collar length to accommodate a wide range of animal sizes. The segmented collar may also be used with the portable unit 232. It is understood that such a segmented strap may be used to attach a portable unit to a portion of the animal 230 other than its neck, such as a leg.

The following paragraph describes some alternative methods of accomplishing the same objects of the present invention. The portable unit 32 may be adapted to operate autonomously, without interacting with a control unit 26. In such a case, the exclusion unit 22 would be adapted to produce a electromagnetic field 34 from which the portable unit 32 would be able to provide an appropriate correction. The portable unit 32 could be programmable so as to store information regarding, for example, which level of correction is desired for each zone (A–D) in the exclusion zone 20.

The comparator 108 may be provided with a different number of reference signal voltage levels, for example 8, thus permitting detection of the animal in 8 different zones, rather than 4.

The information transmitted from the control unit 26 to the portable unit 32 could be encoded using a protocol different from the one described with reference to FIGS. 7 and 8A–8B. For example, a pulse position modulation technique could be used, rather than burst width modulation. The frame could be configured to include more bits for carrying more information. Also, bi-directional radio communications could take place between the control unit 26 and the portable unit 32, in which case the exclusion unit 22 could generate unencoded electromagnetic signals 34.

In summary, an electronic system for controlling the movement of one or more animals relative to at least one selected area has been described. The selected area may be an exclusion area into which an animal is deterred from entering, or may be a containment area from which the animal is deterred from exiting. The system also provides important information to the user, such as battery level condition, provides an optional alarm when the animal enters an exclusion area or is trapped in an exclusion area, and allows the user to maintain a log of animal activity and behavior.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of restricting movement of an animal relative to a control area, comprising the steps of:

electromagnetically generating the control area by a generator;

sensing the animal moving with respect to the control area;

producing a sensing signal in response to sensing the animal moving with respect to the control area;

transmitting the sensing signal to a central controller; and correcting the animal in response to a correction command received from the central controller upon receiving the sensing signal.

2. The method of claim 1, comprising the further step of selecting a correction command in response to which portable unit of a plurality of portable units transmitted the sensing signal.

3. The method of claim 1, comprising the further step of transmitting battery status information from a portable unit to the central controller.

4. The method of claim 3, comprising the further step of warning a user of a battery status of a portable unit.

5. The method of claim 1, comprising the further steps of estimating a separation between the animal and the generator, and selecting a correction command in response to the estimated separation.

6. The method of claim 1, wherein the sensing step further comprises determining whether the animal changes direction in response to correction applied in the correcting step, and the correcting step further comprises adjusting a correction level in response to the determining step.

7. The method of claim 6, wherein the selecting step comprises selecting a correction command associated with a higher degree of correction when the animal approaches the generator.

8. The method of claim 6, wherein the selecting step comprises selecting a correction command associated with a higher degree of correction when the animal moves away from the generator.

9. Apparatus for restricting movement of an animal relative to a first control area, comprising:

a first generator unit to electromagnetically generate the first control area;

a portable unit, affixable to the animal, to detect proximity of the animal relative to the first generator unit, to transmit first generator unit proximity information and provide correction to the animal in response to a received control signal; and a central controller to transmit the control signal in response to the first generator unit proximity information received from the portable unit.

10. The apparatus of claim 9, wherein the first generator unit comprises a receiver to receive the control signal from the central controller and an electromagnetic field transmitter to generate an encoded electromagnetic signal in response to the control signal, and the portable unit comprises a sensor to sense the encoded electromagnetic signal.

11. The apparatus of claim 9, wherein the portable unit comprises a radio transmitter to transmit the generator unit proximity information to the central controller.

12. The apparatus of claim 9, wherein the central controller comprises a memory to store data corresponding to correction levels associated with a plurality of portable units and the central controller transmits the control signal in response to which portable unit of the plurality of portable units transmits the generator unit proximity information.

13. The apparatus of claim 9, wherein the portable unit sensor comprises two orthogonal antennas to sense an electromagnetic field produced by the generator unit.

14. The apparatus of claim 9, wherein the portable unit comprises a detector to detect activity of the animal and the portable unit is configured so as to enter a standby mode during periods of animal inactivity.

15. The apparatus of claim 9, wherein the portable unit comprises an electrical shock generator and an acoustic signal generator to provide correction to the animal.

16. The apparatus of claim 9, further comprising a second generator unit to generate a second electromagnetic signal, the second generator unit receiving control information from the central controller.

17. The apparatus of claim 16 wherein the second generator unit comprises a synchronization circuit to synchronize the second electromagnetic signals with the first electromagnetic signals.

18. The apparatus of claim 9, further comprising at least one contact pin, mounted so as to be spring-loaded, in the portable unit, to form electrical contact with the animal.

19. The apparatus of claim 9, wherein the central controller comprises a memory for storing data corresponding to increased levels of correction when the portable unit detects the animal approaching the generator unit.

20. The apparatus of claim 9, wherein the central controller comprises a memory for storing data corresponding to increased levels of correction when the portable unit detects the animal moving away from the generator unit.

21. A portable unit for applying correction to an animal, comprising:
a mechanism to attach the portable unit to the animal;
a correction signal circuit provided on the potable unit to generate a correction signal in response to the animal control system; and
at least one spring-loaded contact pin to provide electrical connectivity between the correction signal circuit and the animal.

22. A portable unit for applying correction to an animal, comprising:
a mechanism to attach the portable unit to the animal, the mechanism comprising a segmented band with attachable segments so as to vary a length of the segmented band; and
a correction unit mounted on the mechanism to apply a correction signal to the animal.

23. The collar unit of claim 22, wherein the segmented band comprises a first segmented portion, connected at a first end to the portable unit and at a second end to a first connecting mechanism, and a second segmented portion, connected at a first end to the portable unit and at a second end to a second connecting mechanism, the first and second connecting mechanisms co-operatively connectable to secure the first and second segmented portions.

24. A method of restricting movement of an animal relative to an exclusion area, comprising the steps of:
electromagnetically generating the exclusion area by a localized generator;
sensing the animal approaching the exclusion area from outside the exclusion area; and
selectively correcting the animal in response to results of the sensing step.

25. The method of claim 24, wherein the sensing step comprises the step of determining which animal of a plurality of animals is approaching the exclusion area and the correcting step comprises the step of correcting the animal determined in the determining step.

26. The method of claim 24, comprising the further step of estimating a separation distance between the animal and the exclusion area, wherein the correcting step is carried out in response to the estimated separation distance.

27. The method of claim 24, wherein the sensing step further comprises determining whether the animal moves away from the exclusion area in response to correction applied in the correcting step, and the correcting step further comprises adjusting a correction level in response to the determining step.

28. The method of claim 24, including the further step of transmitting battery status information from a portable unit to a central controller.

29. An apparatus for restricting movement of an animal relative to a localized first exclusion area, comprising:
a first exclusion unit to generate the localized first exclusion area electromagnetically; and
a portable unit, affixable to the animal, including a sensor to sense the animal approaching the first exclusion area from outside the first exclusion area and a correction unit to provide correction to the animal in response to a sensor output.

30. The apparatus of claim 29, further comprising a control unit separate from the exclusion unit and the portable unit, the control unit including a radio receiver, wherein the portable unit further comprises a radio transmitter to transmit a sensor output signal to the radio receiver, and the correction unit receives a control signal originating from the control unit to control the correction provided to the animal.

31. The apparatus of claim 30, wherein the portable unit estimates proximity of the portable unit to the first exclusion area, and the control unit comprises a memory to store data corresponding to different levels of correction associated with the estimated proximity.

32. The apparatus of claim 30, wherein the control unit comprises a memory to store data corresponding to correction levels associated with a plurality of portable units and the control unit transmits the control signal in response to which portable unit of the plurality of portable units transmits the sensor signal.

33. The apparatus of claim 30, wherein the portable unit generates a low battery signal in response to a low battery condition, the low battery signal is transmitted to the control unit by the radio receiver and the control unit comprises a warning signal to warn a user of the low battery condition.

34. The apparatus of claim 30, wherein the control unit comprises a computer interface to couple the control unit to a computer.

35. The apparatus of claim 30, wherein the first exclusion unit comprises a radio receiver to receive control information from the control unit.

36. The apparatus of claim 35, further comprising a second exclusion unit in a second exclusion area to generate a second electromagnetic signal detectable by the sensor, the second exclusion unit receiving control information from the control unit, wherein the second exclusion unit comprises a synchronizing circuit to maintain the second electromagnetic signal in a predetermined phase relationship with respect to the first electromagnetic signal.

37. The apparatus of claim 29, wherein the sensor comprises two orthogonal antennas and a circuit sampling an antenna signal produced by one of the antennas, a gain module to amplify the antenna signal and a comparator to compare an output from the gain module with reference signal.

38. The apparatus of claim 29, wherein the sensor comprises a detector to detect activity of the animal and the portable unit is configured so as to enter a standby mode during periods of inactivity of the animal.

39. The apparatus of claim 29, wherein the correction unit comprises an electrical shock generator and an acoustic signal generator.

40. The apparatus of claim 29, wherein the correction unit comprises at least one spring-loaded contact pin to form an electrical contact between the animal and the correction unit.

* * * * *